US012759724B2

(12) United States Patent
Sarkar

(10) Patent No.: US 12,759,724 B2
(45) Date of Patent: Oct. 13, 2026

(54) HYDROGEN FUEL SYSTEM FOR AIRCRAFT

(71) Applicant: Eaton Intelligent Power Limited, Dublin (IE)

(72) Inventor: Subrata Sarkar, Maharashtra (IN)

(73) Assignee: Eaton Intelligent Power Limited, Dublin (IE)

( * ) Notice: Subject to any disclaimer, the term of this patent is extended or adjusted under 35 U.S.C. 154(b) by 650 days.

(21) Appl. No.: 18/305,030

(22) Filed: Apr. 21, 2023

(65) Prior Publication Data

US 2023/0339621 A1 Oct. 26, 2023

(30) Foreign Application Priority Data

Apr. 22, 2022 (IN) ............................ 202211023736

(51) Int. Cl.

| | |
|---|---|
| ***B64D 37/34*** | (2006.01) |
| ***B64D 37/04*** | (2006.01) |
| ***B64D 37/18*** | (2006.01) |
| ***B64D 37/30*** | (2006.01) |
| ***F04F 5/36*** | (2006.01) |
| ***F04F 5/44*** | (2006.01) |

(52) U.S. Cl.

CPC ............ *B64D 37/30* (2013.01); *B64D 37/04* (2013.01); *B64D 37/18* (2013.01); *F04F 5/36* (2013.01); *F04F 5/44* (2013.01)

(58) Field of Classification Search

CPC ............ B64D 37/34; B64D 2041/005; H01M 2250/20; F02C 3/22

See application file for complete search history.

(56) References Cited

U.S. PATENT DOCUMENTS

| | | | |
|---|---|---|---|
| 5,660,358 | A | 8/1997 | Grafwallner et al. |
| 6,641,084 | B1 | 11/2003 | Huber et al. |
| 7,531,257 | B2 | 5/2009 | Sugawara et al. |
| 7,655,336 | B2 | 2/2010 | Muto et al. |
| 7,954,753 | B2 | 6/2011 | Hoffjann et al. |

(Continued)

FOREIGN PATENT DOCUMENTS

| | | |
|---|---|---|
| JP | 3909819 B2 | 4/2007 |
| JP | 4630040 B2 | 2/2011 |

(Continued)

OTHER PUBLICATIONS

Extended European Search Report for Application No. 23167974.7 mailed Sep. 14, 2023.

(Continued)

*Primary Examiner* — Paul J Gray
(74) *Attorney, Agent, or Firm* — Merchant & Gould P.C.

(57) ABSTRACT

A hydrogen fuel system for an aircraft is configured to provide hydrogen fuel to the engines for propulsion. The fuel system also may provide hydrogen fuel to a fuel cell arrangement to generate electricity for use on the aircraft. The fuel cell arrangement may be selectively coupled to the feed lines for the engines. A ventilation system regulates the pressure within the one or more fuel tanks and the feed lines. The ventilation system can vent hydrogen vapor to atmosphere or can transfer hydrogen vapor between the fuel tanks and the fuel cell arrangement. A jet pump and accumulator may pull vapor from the feed lines as needed.

21 Claims, 5 Drawing Sheets

(56) References Cited

U.S. PATENT DOCUMENTS

| | | | |
|---|---|---|---|
| 8,522,906 B2 | 9/2013 | Kaburagi et al. | |
| 9,214,684 B2 | 12/2015 | Kwon et al. | |
| 9,464,573 B2 | 10/2016 | Remy et al. | |
| 2005/0147863 A1 | 7/2005 | Hiramatsu et al. | |
| 2008/0044704 A1 | 2/2008 | Kubo et al. | |
| 2015/0311544 A1 | 10/2015 | Jung et al. | |
| 2015/0344143 A1* | 12/2015 | Epstein .................. | B64D 37/30 244/135 C |
| 2020/0398992 A1 | 12/2020 | Morrison | |
| 2021/0010641 A1 | 1/2021 | Kim et al. | |

FOREIGN PATENT DOCUMENTS

| | | |
|---|---|---|
| JP | 6041696 B2 | 12/2016 |
| WO | 2014/105333 A1 | 7/2014 |

OTHER PUBLICATIONS

Brewer, G.D. et al., "Study of Fuel Systems for LH2-Fueled Subsonic Transport Aircraft," Langley Research Center—National Aeronautics and Space Administration, Jul. 1978, 201 pp.

* cited by examiner

HYDROGEN FUEL SYSTEM FOR AIRCRAFT

CROSS-REFERENCE TO RELATED APPLICATION(S)

This application claims the benefit of Indian Provisional Application Serial No. 202211023736 filed Apr. 22, 2022, the disclosure of which is hereby incorporated by reference in its entirety.

BACKGROUND

Traditional fossil fuel-based aircraft system have been in use for many years. The fossil fuel is utilized within a combustor of a jet engine to produce thrust. Typically, an auxiliary power system also is provided aboard the aircraft to produce electrical power (e.g., for cabin electricity, to power the compressor for cabin pressurization, etc.) However, fossil fuel is not a clean burning energy source.

SUMMARY

Hydrogen provides a cleaner burning fuel than traditional fossil fuel, resulting in fewer greenhouse gas emissions. However, the design of a hydrogen fuel system—especially for an aircraft—presents a number of challenges. For example, the hydrogen must be stored safely aboard the aircraft. Further, the weight of the aircraft should be mitigated to the extent possible.

Some aspects of the disclosure are directed to fuel systems that utilize hydrogen (e.g., liquid hydrogen) within an engine to generate propulsion of an aircraft. Other aspects of the disclosure are directed to fuel systems that utilize hydrogen for electric power on board the aircraft. Other aspects of the disclosure are directed to fuel systems that utilizes hydrogen for both propulsion and onboard electricity.

In accordance with some aspects of the disclosure, a hydrogen fuel system is configured to safely store the hydrogen both during flight and between flights. The hydrogen fuel system also is configured to transfer the hydrogen between storage and various equipment (e.g., an engine, a fuel cell, etc.). In certain implementations, the hydrogen fuel system is configured to accommodate vaporization of the hydrogen occurring during and/or between flights.

In some implementations, the hydrogen is stored primarily in a liquid form. When provided to an engine, the hydrogen may be converted to a supercritical liquid form. When provided to a fuel cell, the hydrogen may be converted to a high pressure gaseous state. In certain implementations, the fuel system provides thermal management during these transitions. In certain implementations, the fuel system provides pressure regulation at the fuel tank arrangement and/or throughout the fuel system.

In accordance with some aspects of the disclosure, a hydrogen fuel system for an aircraft includes a fuel tank configured to store hydrogen in a liquid state; a boost pump arrangement disposed within the fuel tank; an engine feeder sub-system; and a fuel cell sub-system. The engine feeder sub-system includes a feed line connecting the boost pump arrangement to a high pressure pump disposed at an engine of the aircraft. The high pressure pump directs fuel from the feed line to a first heat exchanger and then to a fuel injector. The first heat exchanger is configured to heat the hydrogen to a supercritical liquid state. The fuel cell sub-system includes a fuel cell arrangement and a second heat exchanger upstream of the fuel cell arrangement. The second heat exchanger is coupled to the feed line of the engine feeder sub-system. The second heat exchanger is configured to heat the hydrogen to a gaseous state.

In accordance with other aspects of the disclosure, a hydrogen fuel system for an aircraft includes a fuel tank configured to store hydrogen in a liquid state; an engine feeder sub-system; an accumulator; and a jet pump. The engine feeder sub-system includes a feed line connecting the fuel tank to a high pressure pump disposed at an engine of the aircraft. The high pressure pump directs fuel from the feed line to a first heat exchanger and then to a fuel injector. The first heat exchanger is configured to heat the hydrogen to a supercritical liquid state. The accumulator is disposed in parallel with the feed line to store pressurized hydrogen obtained from the feed line. The accumulator is configured to selectively direct the pressurized hydrogen to the high pressure pump. The jet pump has a first input coupled to the feed line, a second input coupled to the accumulator, and an output. The jet pump is configured to draw hydrogen vapor from the feed line via the first input when the accumulator directs pressurized hydrogen through the jet pump towards the output.

In accordance with other aspects of the disclosure, a hydrogen fuel system for an aircraft includes a fuel tank configured to store hydrogen in a liquid state; a fuel cell sub-system; a tank pressurization line; and a shutoff valve disposed along the tank pressurization line. The fuel cell sub-system includes a fuel cell arrangement and a heat exchanger upstream of the fuel cell arrangement. The heat exchanger is coupled to the fuel tank via a feed line. The second heat exchanger is configured to heat the hydrogen obtained via the feed line to a gaseous state. The tank pressurization line is separate from the feed line. The tank pressurization line extends between the fuel tank and a fuel cell line that is disposed downstream of the heat exchanger and upstream of the fuel cell arrangement. The shutoff valve selectively isolates the fuel tank from the fuel cell line.

In certain implementations, the engine feeder sub-system and/or the fuel cell sub-system receives hydrogen fuel from each of two fuel tanks. In certain examples, each fuel tank supplies fuel to a respective one of the engines of the aircraft. In certain examples, each fuel tank supplies fuel to the one or more engines of a respective wing of the aircraft. In certain examples, each of the fuel tanks may be separately isolated from the engine feeder sub-system and/or the fuel cell sub-system via shutoff valves. In certain examples, the feed lines may be joined at a crossfeed valve so that the engine feeder sub-system and/or the fuel cell sub-system may be supplied by only one of the fuel tanks.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
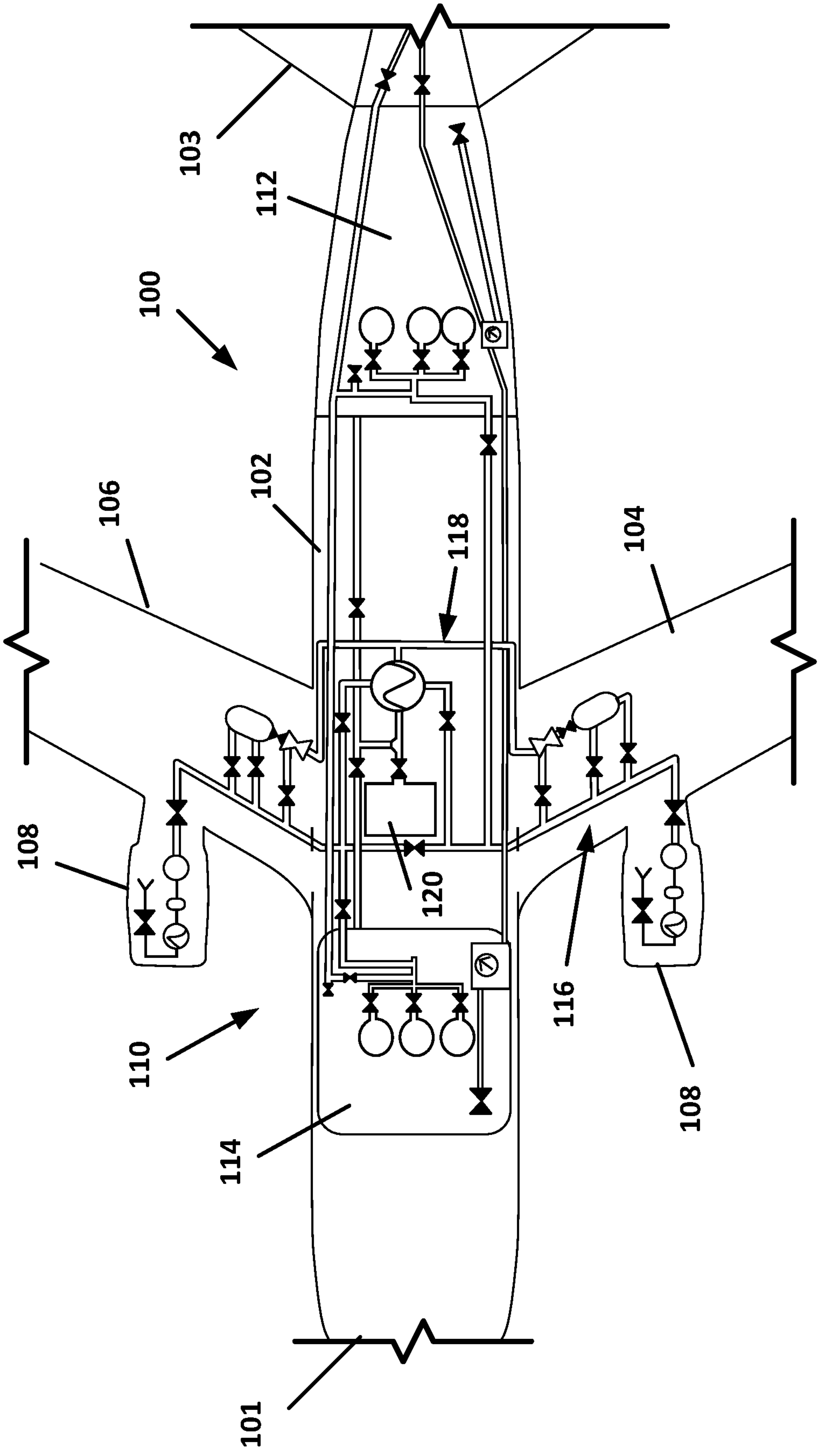
FIG. 1 is a schematic diagram of an example hydrogen fuel system for an aircraft, the hydrogen fuel system including an engine feeder sub-system and a fuel cell sub-system.

FIG. 1 illustrates an example aircraft 100 extending between a front 101 and a rear 103. The aircraft 100 includes a fuselage 102 in which a pilot and optionally one or more passengers and/or cargo may be carried. For example, the fuselage may include a cockpit, cabin, and/or cargo hold. The aircraft 100 also includes first and second wings 104, 106. Each wing 104, 106 carries one or more engines 108 (e.g., a turbine engine such as a Turbofan engine). The engines 108 generate thrust to propel the aircraft 100 forward.

The aircraft 100 includes a hydrogen fuel system 110 including one or more fuel tanks 112, 114 in which to store hydrogen fuel. In certain implementations, the fuel system 110 includes an engine feeder sub-system 116 that transfers hydrogen from the fuel tank(s) 112, 114 to the engines 108 as will be described in more detail herein. For example, the engine feeder sub-system 116 may pressurize the hydrogen fuel to generate flow from the fuel tank 112, 114, along a feed line 122, 128, to the engines 108 in which a supercritical form of the hydrogen is burned in combustors. In certain implementations, the hydrogen fuel system 110 includes a fuel cell sub-system 118 that transfers hydrogen between the fuel tank(s) 112, 114 and a fuel cell arrangement 120 for the generation of electricity as will be described in more detail herein. For example, the fuel cell sub-system 118 may pressurize the hydrogen fuel to generate flow from the fuel tank 112, 114 to a heat exchanger 160 upstream of the fuel cell arrangement 120 at which the hydrogen is transitioned into vapor for the fuel cell arrangement 120.

Each fuel tank 112, 114 is configured to hold hydrogen in a primarily liquid state. Portions of the hydrogen fuel may transition to vapor before, during, or after the flight. Systems for maintaining pressurization of the hydrogen fuel within the fuel tanks 112, 114 will be described in more detail herein. In certain implementations, each fuel tank 112, 114 is configured to hold the liquid hydrogen at a pressure ranging between 18 psia and 24 psia. In certain examples, each fuel tank 112, 114 is configured to hold the liquid hydrogen at a pressure ranging between 20 psia and 23 psia. In certain examples, each fuel tank 112, 114 is configured to hold the liquid hydrogen at a pressure of about 21 psia. In certain implementations, each fuel tank 112, 114 is configured to maintain the liquid hydrogen at a temperature between 18K and 25K. In certain examples, each fuel tank 112, 114 is configured to maintain the liquid hydrogen at a temperature of about 20K.

In the example shown, the hydrogen fuel system 110 includes a first fuel tank 112 disposed at the rear 103 of the aircraft 100 and a second fuel tank 114 disposed at the front 101 of the aircraft 100. In certain examples, the fuel cell sub-system 118 is disposed between the first and second fuel tanks 112, 114. In certain examples, the wings 104, 106 extend outwardly from the fuselage at a location between the first and second fuel tanks 112, 114. The first and second fuel tanks 112, 114 are positioned and sized to mitigate any effect on the center of gravity of the aircraft. In certain examples, the first and second fuel tanks 112, 114 have different shapes and sizes. In other implementations, the second fuel tank 114 can be disposed at a top of the fuselage (e.g., above the fuel cell sub-system 18 instead of at the front).

In certain implementations, each fuel tank 112, 114 is configured to supply fuel to the engine(s) 108 of a respective one of the wings 104, 106. In the example shown, the first tank 112 supplies hydrogen fuel to the engine(s) 108 of the first wing 104 and the second tank 114 supplies hydrogen fuel to the engine(s) 108 of the second wing 106. In certain implementations, the engine feeder sub-system 116 includes a first feed line 122, which extends between a pump arrangement 124 of the first tank 112 and the one or more engines 108 of the first wing 104, and a second feed line 128, which extends between a pump arrangement 130 of the second tank 114 and the one or more engines 108 of the second wing 106 (e.g., see FIG. 2).

In certain implementations, the fuel cell sub-system 118 is configured to provide fuel to the fuel cell arrangement 120 from both of the fuel tanks 112, 114 along different paths. For example, a first path of the fuel cell sub-system 118 is connected to the first feed line 122 and a second path of the fuel cell sub-system 118 is connected to the second feed line 128. In certain examples, each fuel tank 112, 114 supplies about the same amount of fuel to the fuel cell arrangement 120. In certain implementations, when the aircraft 100 is first started and before the engine 108 is operating, only one of the boost pumps 124, 130 within each fuel tank 112, 114 operates to supply fuel to the fuel cell arrangement 120. In some examples, the boost pump 124, 130 is powered by a battery until the fuel cell sub-system 118 is active. In other examples, the boost pump 124, 130 is powered by a ground power source until the fuel cell sub-system 118 is active.

In certain implementations, the first and second feed lines 122, 128 are separate from each other. In certain implementations, a crossfeed valve 134 separates the first and second feed lines 122, 128 (e.g., see FIG. 2). During normal operation of the aircraft, the crossfeed valve 134 remains closed. If the pump arrangement 124, 130 of one of the fuel tanks 112, 114 fails during operation of the aircraft, however, then the crossfeed valve 134 can be opened to allow the other pump arrangement 124, 130 to supply hydrogen fuel to the engines 108 of both wings 104, 106.

Figure 2:
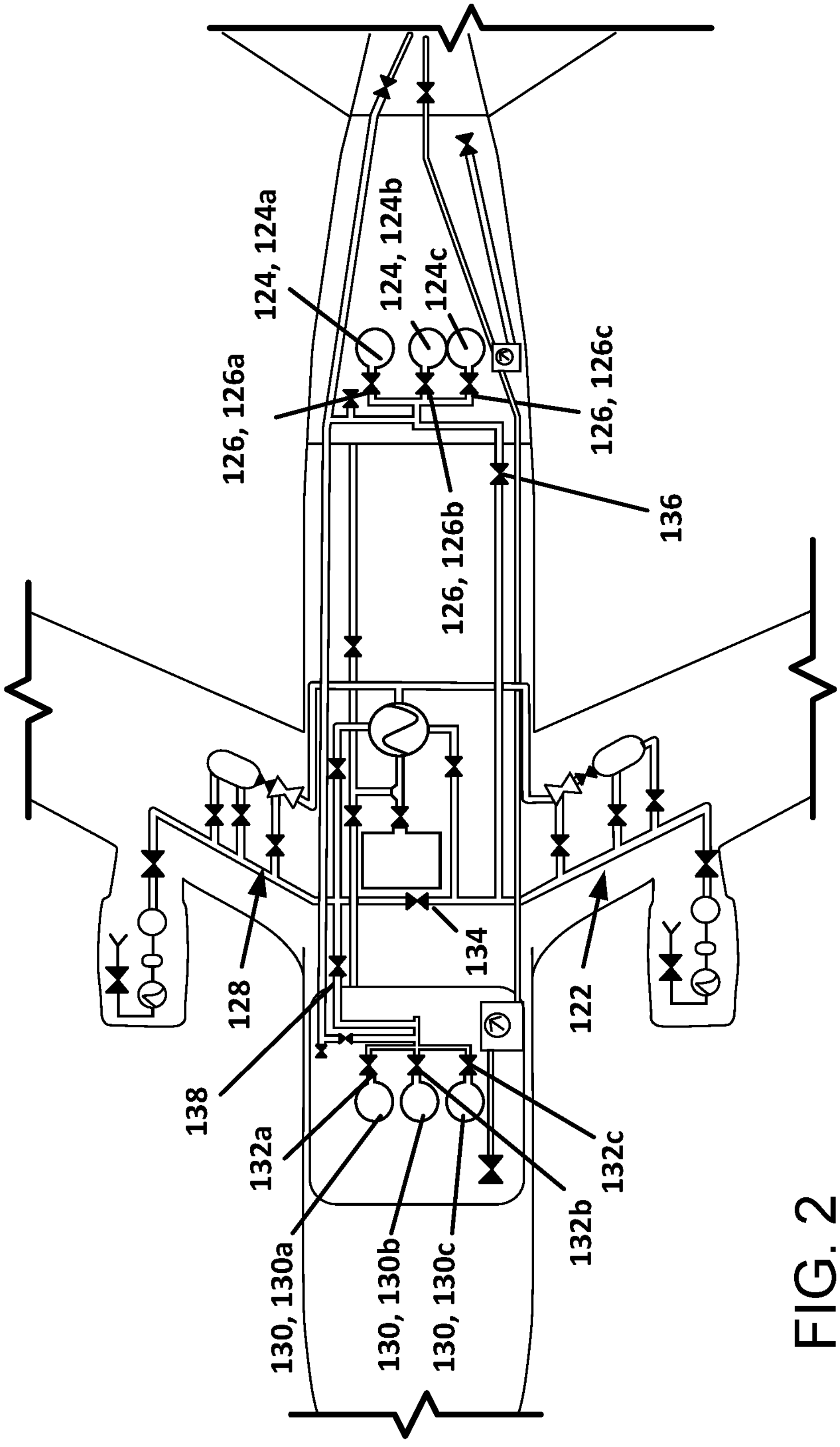
FIG. 2 shows the fuel tanks of the hydrogen fuel system of FIG. 1.

In certain implementations, each pump arrangement 124, 130 includes one or more boost pumps 124, 130 (e.g., see FIG. 2). In certain examples, each pump arrangement 124, 130 includes a respective plurality of boost pumps 124, 130. In the example shown, each pump arrangement 124, 130 includes three boost pumps 124*a*, 124*b*, 124*c*, 130*a*, 130*b*, 130*c*. In other examples, each pump arrangement 124, 130 may include a greater or lesser number of boost pumps 124, 130. In certain implementations, the boost pumps 124, 130 are low-pressure pumps (e.g., around 46-50 psig). In certain implementations, the boost pumps 124, 130 are variable speed pumps. In certain implementations, the boost pumps 124, 130 are centrifugal pumps. In certain examples, the boost pumps 124, 130 are low-pressure, variable speed, centrifugal pumps.

In certain examples, the pump arrangement 124, 130 includes one more boost pump 124, 130 than necessary to operate the engine feeder sub-system 116. In certain examples, the additional boost pump 124, 130 can be used for redundancy in case of failure of one of the other boost pumps 124, 130. In some examples, the additional boost pump 124, 130 can be used to operate the fuel cell sub-system 118. In other examples, the same boost pump 124, 130 can be used in the operation of both the engine feeder sub-system 116 and the fuel cell sub-system 118.

A check valve 126, 132 is disposed at the outlet of each boost pump 124, 130. In certain implementations, the check valve 126, 132 is configured to provide thermal relief. When the respective boost pump 124, 130 is not operating, the hydrogen fuel within the pump 124, 130 will transition to vapor, thereby increasing pressure within the pump 124, 130. The thermal relief discharges the vapor from the pump 124, 130 back into the respective fuel tank 112, 114.

The tanks 112, 114 are sufficiently insulated to maintain the hydrogen fuel within an acceptable temperature range (e.g., between 18K-25K). The feed lines 122, 128 are less insulated. Accordingly, shutoff valves 136, 138 are disposed along the first and second feed lines 122, 128 at the port for the fuel tanks 112, 114. The shutoff valves 136, 138 help to isolate the fuel tanks 112, 114 from the feed lines 122, 128 to mitigate the heat transfer through the feed lines 122, 128 to the tanks 112, 114. For example, the shutoff valves 136, 138 may be closed when the boost pumps 124, 130 are not supplying hydrogen fuel flow to the engine feeder sub-system 116 or to the fuel cell sub-system 118. In certain examples, the shutoff valves 136, 138 are disposed external of the fuel tanks 112, 114. In other implementations, the shutoff valves 136, 138 are omitted.

Figure 3:
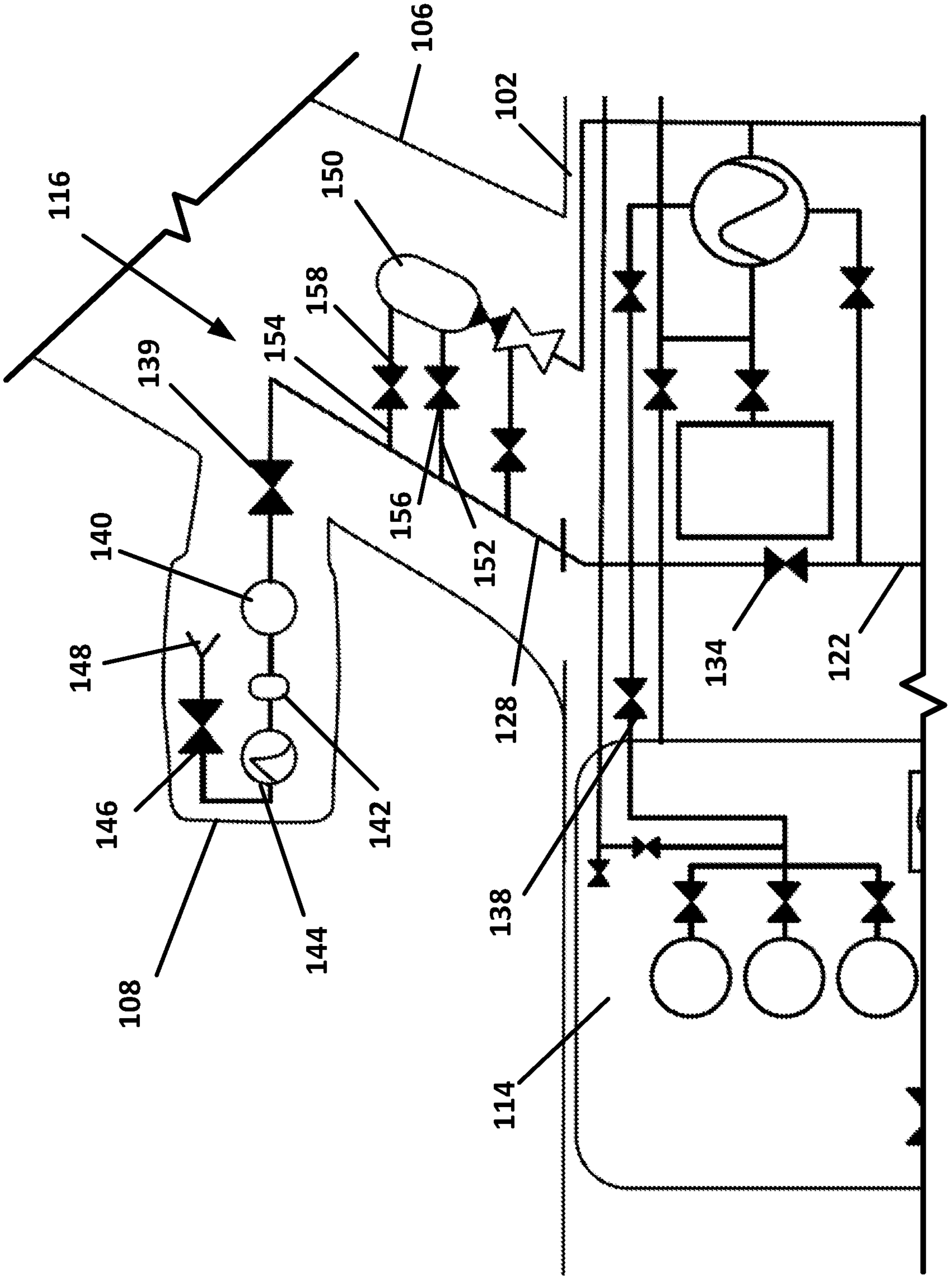
FIG. 3 is an enlarged view of the diagram of FIG. 1 showing a portion of the engine feeder sub-system of FIG. 1.

FIG. 3 is an enlarged view of an example engines 108 disposed on one of the wings 106 and the portion of the engine feeder sub-system 116 extending thereto. The feed lines 122, 128 extend between the crossfeed valve 134, which remains closed during normal operating conditions of the aircraft 100, and respective portions of the engine feeder sub-system 116. It will be understood that each feed line 122, 128 can service multiple engines 108 with the same configuration. It will be further understood that the feed line 122 servicing the other wing (not shown in FIG. 3) may have the same configuration as the feed line 128 shown in FIG. 3.

The feed line 122, 128 of the engine feeder sub-system 116 extends from the shutoff valve 138 at the respective fuel tank 112, 114 to another shutoff valve 139 disposed at a respective engine 108. During an emergency or other requirements, the flow of hydrogen fuel to the engines 108 can be stopped at the shutoff valves 139 or at the shutoff valves 138. In certain examples, the shutoff valves 139 are disposed outside the nacelles of the engines 108.

In certain implementations, the engine feeder sub-system 116 extends from the shutoff valve 139 to a high pressure pump 140. The high pressure pump 140 raises a pressure of the hydrogen fuel flowing along the feed line 128 to provide an appropriate injection pressure at a combustor of the engine 108. In certain examples, the high pressure pump 140 is a multistage pump. In certain examples, the high pressure pump 140 is centrifugal type pump. In certain examples, the high pressure pump 140 is a multistage centrifugal pump with a high operating speed. In certain examples, the high pressure pump 140 is mounted on an auxiliary gearbox of the engine 108.

In certain implementations, the combination of the high pressure pump 140 at the engine 108 and the one or more boost pumps 130 at the fuel tanks 112, 114 enables the omission of a fuel return line from the engine 108. Eliminating the fuel return lines reduces the weight of the aircraft 100 and increases fuel system efficiency.

The high pressure pump 140 directs the pressurized hydrogen fluid towards a heat exchanger 144. While in the fuel tanks 112, 114, the hydrogel fuel is maintained at a temperature of about 18K-25K. While traveling through the feed lines 122, 128 and the high pressure pump 140, however, the temperature of the hydrogen fuel rises. In certain examples, the hydrogen fuel may have a temperature between 30K and 70K upon reaching the heat exchanger 144. In certain examples, the hydrogen fuel may have a temperature between 40K and 60K upon reaching the heat exchanger 144. In an example, the hydrogen fuel has a temperature around 50K upon reaching the heat exchanger 144. However, this raise in temperature is not sufficient to allow injection of the hydrogen fuel into the combustor without increasing the combustion instability. Further, injecting such cold hydrogel into the combustor may increase the specific fuel consumption of the combustor. Accordingly, the heat exchanger 144 further heats the hydrogen fuel to a temperature appropriate for use within the combustor (e.g., at least 100K, at least 200K, at least 250K, at least 280K, at least 290, or at least 300K). In certain implementations, the heat exchanger 144 also manages the heat from other components of the engine 108 to enhance the overall efficiency of the engine 108. For example, the heat exchanger 144 may extract waste heat from the engine exhaust, the turbine blade, the oil heat exchanger, and/or the Environmental Control System. This extracted heat may be used to heat the hydrogen fuel.

A flow meter unit 142 may be disposed between the high pressure pump 140 and the heat exchanger 144. The flow meter unit 142 regulates the flow supply to the combustor based on commands received from an electronic control unit (not shown).

From the heat exchanger 144, the hydrogen fuel flow is directed to an injection valve 146 and injection nozzle 148. The high pressure pump 140 is configured to sufficiently pressurize the hydrogen fuel to overcome the pressure drop associated with the heat exchanger 144, the flow meter unit 142, and the injection valve 146. The injection nozzle 148 directs the heated, pressurized hydrogen fuel into the combustor of the engine 108. In certain examples, the hydrogen fuel is heated and pressurized to a supercritical fluid before reaching the combustor.

A respective accumulator 150 can be disposed along each of the feed line 122, 128. An accumulator input line 152 may lead from the feed line 122, 128 to an input of the accumulator 150 and an accumulator output line 154 may lead from an output of the accumulator 150 back to the feed line 122, 128. In certain examples, the connection between the feed line 122, 128 and the accumulator input line 152 is upstream of the connection between the feed line 122, 128 and the accumulator output line 154. Accordingly, while hydrogen fuel is being supplied along the feed line 122, 128 to the engine 108, a portion of the hydrogen fuel may be directed along the accumulator input line 152 to the accumulator 150. The accumulator 150 stores pressurized hydrogen fuel received from the input line 152. A shutoff valve 156 opens to direct flow to the accumulator 150 during flow to the engine 108 and closes when the accumulator 150 is filled. In certain examples, another shutoff valve 158 is disposed along the accumulator output line 154 to block flow from leaving the accumulator 150. The shutoff valves 156 are controlled by an electronic control unit.

In certain implementations, the accumulator 150 supplies pressurized hydrogen to the respective engine(s) 108 by opening the shutoff valves 158. For example, the accumulator 150 may supply the pressurized hydrogen when the boost pump 124, 130 is not operational (e.g., during engine restart). In another example, the accumulator 150 may supply the pressurized hydrogen when pressure within the feed lines 122, 128 drops below a predetermined threshold due to a negative g operation. For example, the accumulator 150 may supply the pressurized hydrogen when pressure within the feed lines 122, 128 drops below 46 psig. Another function of the accumulator 150 will be described in more detail herein with reference to FIG. 4.

Figure 4:
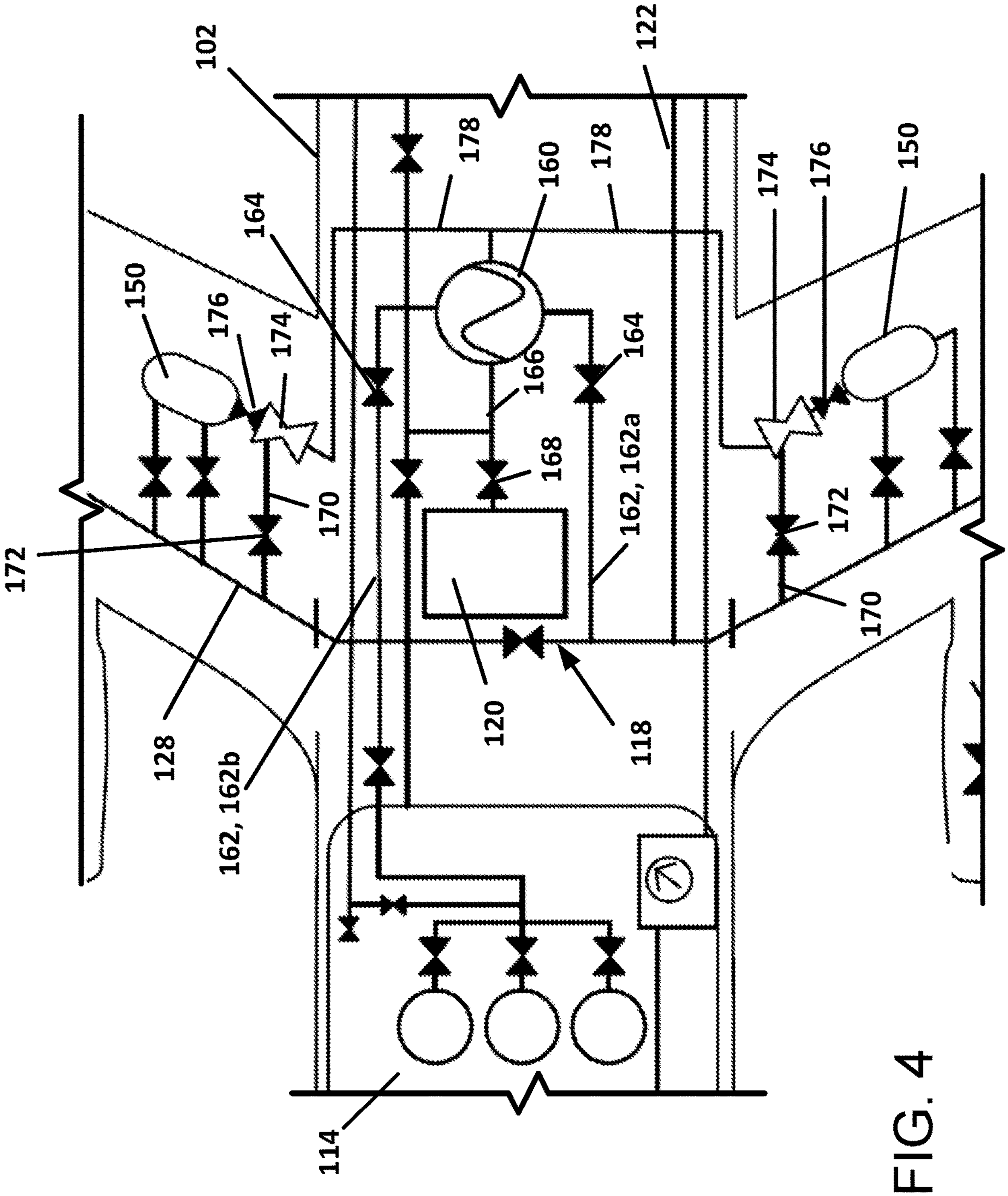
FIG. 4 is an enlarged view of the diagram of FIG. 1 showing the fuel cell sub-system of FIG. 1.

FIG. 4 is an enlarged view of an example implementation of the fuel cell sub-system 118. The fuel cell sub-system 118 includes cell feed lines 162 leading from the feed lines 122, 128 to a heat exchanger 160. An output line 166 leads from the heat exchanger 160 to a fuel cell arrangement 120. The fuel cell arrangement 120 includes one or more stacks of one or more fuel cells. Each fuel cell is configured to receive the hydrogen fuel and to convert chemical energy of the hydrogen fuel and an oxidizing agent into electricity. A shutoff valve 168 is disposed at the fuel cell arrangement 120 to selectively stop the flow of fuel to the fuel cell arrangement 120 (e.g., when the fuel cell arrangement 120 is not operating or during an emergency condition).

The electricity can be used to power various equipment on the aircraft. For example, the electricity can be used to power equipment (e.g., a compressor or pump) to pressurize the cabin, to provide lighting and/or heat within the cabin, to power defrosters on the wings or other parts of the aircraft 100, to start the engine 108, to power the instrument panel within the cockpit, and/or to power the mission and flight control processor system of the aircraft 100. In certain examples, the fuel cell sub-system 118 enables the omission of a standard auxiliary power unit (e.g., a gas turbine engine typically installed at a tail of the aircraft). Accordingly, the only fuel needed to be supplied to the aircraft 100 is hydrogen.

In certain implementations, the fuel cell sub-system 118 also can contribute power for propulsion of the aircraft. For example, the engine 108 may be sized to enhance efficiency during cruising of the aircraft, which requires less power, instead of for takeoff, which requires more power. In such examples, the takeoff power is supplied by both the engine combustor and the fuel cell arrangement 120. For example, electricity generated by the fuel cell arrangement 120 can be directed to a hybrid electrical powertrain of the engine 108. Sizing the engines 108 for cruising instead of takeoff allows for the utilization of smaller/lighter engines.

In certain implementations, one cell feed line **162*a* leads from the first feed line 122 and another cell feed line 162*b* leads from the second feed line 128. Accordingly, the fuel cell arrangement 120 may receive hydrogen fuel from both fuel tanks 112, 114. In other implementations, however, the fuel cell arrangement 120 may receive fuel from only one of the tanks 112, 114. Each cell feed line 162*a*, 162*b* has a flow control valve 164 that regulates the hydrogen fuel flow to the fuel cell arrangement 120. In some implementations, the fuel tanks 112, 114 are sufficiently pressurized that fuel flows to the fuel cell arrangement 120. In other implementations, one of the boost pumps 124, 130 within the fuel tanks 112, 114 may operate to push the hydrogen fuel towards the fuel cell arrangement 120**.

The fuel cell arrangement 120 produces heat. For example, a ratio of heat to power production capacity of the fuel cell arrangement 120 may be about 1:1. The heat exchanger 160 manages the waste heat produced by the fuel cell arrangement 120. The hydrogen fuel is routed along the cell feed lines 162, **162*a*, 162*b* to the heat exchanger to act as the cooling medium. The heat exchanger 160 transfers the waste heat to the hydrogen fuel as the hydrogen fuel passes through the heat exchanger 160 towards the fuel cell arrangement 120. Increasing the temperature of the hydrogel fuel causes the fuel to transition to a gaseous state for use within the fuel cell arrangement 120. In certain implementations, the heat exchanger 160** may be supplemented by a secondary thermal management system such as an Ethylene Glycol heat transfer unit.

During a non-operational state of the aircraft 100, heat soak (e.g., from the fuel cell arrangement 120 and/or from the engines 108) will transform the hydrogen fuel left in the feed lines 122, 128 to vapor. This vapor increases pressure within the feed lines 122, 128. In certain implementations, the shutoff valves 136, 138 may include a reverse flow check valve configured to discharge the excess pressure into the respective tank 112, 114.

In certain implementations, jet pumps 174 are disposed between the feed lines 122, 128 and the heat exchanger 160. For example, a jet pump 174 can have a first input line 170 in communication with the feed line 122, 128, a second input line 176 in communication with the accumulator 150, and an output line 178 in communication with the heat exchanger 160. When needed, liquid hydrogen is released from the accumulator 150 and carried along the second input line 176, through the jet pump 174, and into the output line 178. Thereby, the high pressure liquid hydrogen in the accumulator 150 forms the motive flow of the jet pump 174. This motive flow induces flow of hydrogen vapor from the feed lines 122, 128 into the output line 178 via the first input lines 170. Accordingly, the hydrogen vapor extracted from the feed liners 122, 128 is supplied to the fuel cell arrangement 120 along with the pressurized liquid hydrogen from the accumulator 150. In certain examples, check valves 172 are disposed along the first input lines 170 to inhibit reverse flow from the fuel cell sub-system 118 back to the feed lines 122, 128. In certain examples, the check valves 172 are closed when the jet pumps 174 are not operating. In certain examples, the jet pumps 174 cooperate with the reverse flow check valves of the fuel tank shutoff valves 136, 138 to extract hydrogen vapor from the feed lines 122, 128.

Figure 5:
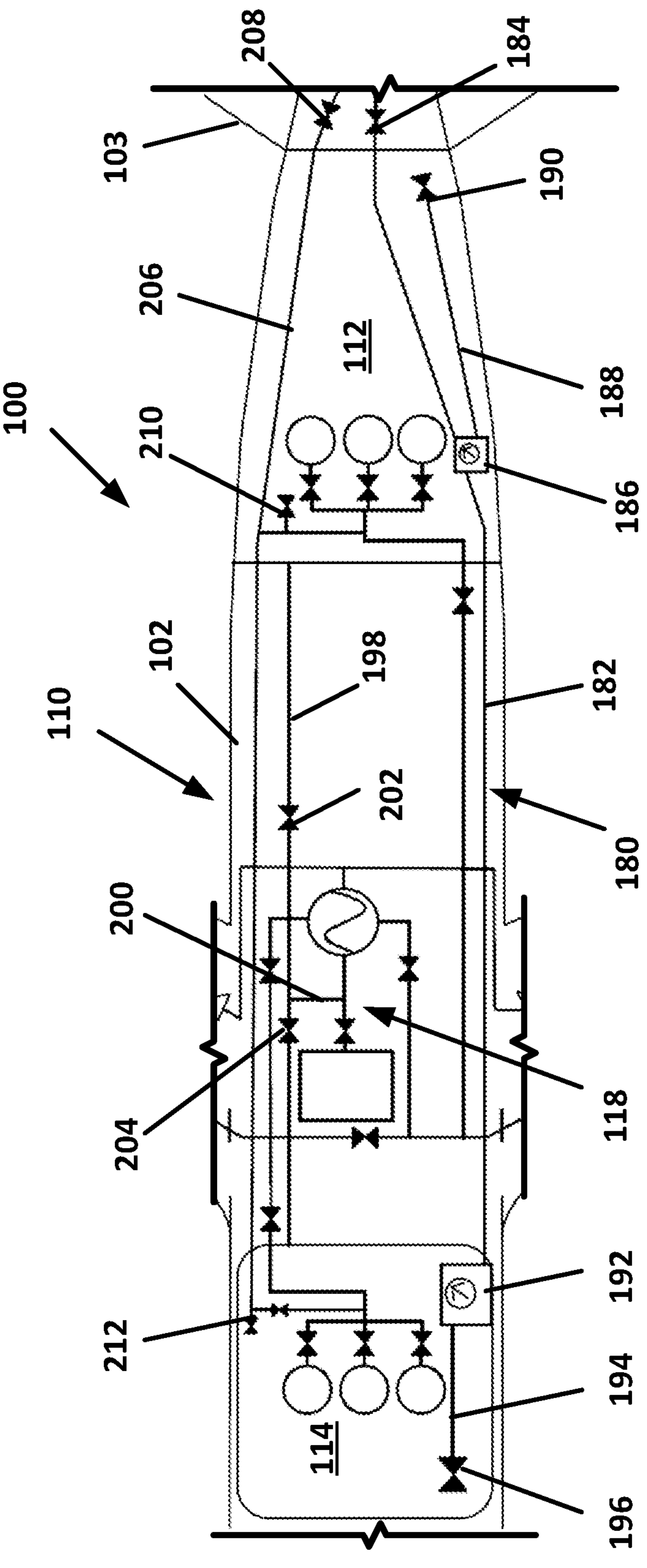
FIG. 5 illustrates a ventilation sub-system and a fuel line of the hydrogen fuel system of FIG. 1.

Referring to FIG. 5, the fuel system 110 includes a ventilation sub-system 180 that allows hydrogen vapor to be removed from the fuel tanks 112, 114 (e.g., to decrease pressure within the tanks 112, 114, to provide room for additional liquid hydrogen, etc.). The ventilation sub-system 180 includes a ventilation line 182 extending from a port 184 to a pressure regulator assembly 186 at the first fuel tank 112 and a pressure regulator assembly 192 at the second fuel tank 114. The pressure regulator assemblies 186, 192 maintain pressure within the fuel tanks 112, 114 (e.g., at around 21 psia).

Some of the hydrogen fuel in the fuel tanks 112, 114 may vaporize over time, which increases pressure within the fuel tanks 112, 114. Alternatively, vapor from the feed lines 122, 128 may be transferred to the tanks 112, 114 at the valves 136, 138 to reduce pressure within the feed lines 122, 128. As pressure within the tanks 112, 114 builds up beyond a predetermined threshold (e.g., beyond 21 psia, beyond 22 psia, beyond 23 psia), the pressure regulators 186, 192 open and release excess pressure into the atmosphere (i.e., outside the aircraft 100). In particular, hydrogen vapor from the fuel tanks 112, 114 enters ventilation sub-lines 188, 194 at check valves 190, 196 and flows to the pressure regulators 186, 192. In certain examples, each pressure regulator 186, 192 includes two regulator valves. A first valve of each pressure regulator 186, 192 opens at the predetermined threshold. A second valve of each pressure regulator is provided for redundancy and so opens at a second threshold higher than the predetermined threshold (e.g., beyond 22 psia, beyond 23 psia, beyond 24 psia).

In certain implementations, the ventilation sub-system 180 also includes a tank pressurization line 198 that extends between the first and second fuel tanks 112, 114. The tank pressurization line 198 also connects to the fuel cell sub-system 118 so that hydrogen vapor may be transferred between the fuel tanks 112, 114 and the fuel cell sub-system 118. Accordingly, vapor can be removed from the fuel tanks 112, 114 and directed to the fuel cell 120 for consumption to further generate electrical power. In an example, excess hydrogen vapor may be transitioned from the fuel tanks 112, 114 to the tank pressurization line 198 when the pressure within the fuel tanks 112, 114 exceeds a predetermined threshold (e.g., 21 psia, 22 psia, 23 psia). Directing the excess hydrogen vapor to the fuel cell arrangement 120 instead of venting to the atmosphere reduces hydrogen loss from the fuel system 110.

Furthermore, during flight, pressure within the fuel tanks 112, 114 may decrease. If left unchecked, this decreased pressure encourages the generation of additional hydrogen vapor. The decreased pressure also can apply a load to the structure of the fuel tanks 112, 114. To mitigate a decrease in pressure, high-pressure hydrogen vapor can be transferred from the fuel cell arrangement 120 via a fuel cell line 200 to the tank pressurization line 198 and, thereby, to the fuel tanks 112, 114 to increase the pressure within the fuel tanks 112, 114. The fuel cell line 200 is downstream of the heat exchanger 160 so the hydrogen within the fuel cell line 200 is pressurized. In certain examples, the tank pressurization line 198 has a first shut-off valve 202 between the fuel cell line 200 and the first fuel tank 112 and a second shut-off valve 204 between the fuel cell line 200 and the second fuel tank 114 so that pressurized vapor can be transferred to either of the fuel tanks 112, 114 or both fuel tanks 112, 114 as needed.

In certain implementations, the fuel system 110 includes a refueling/defueling line 206 extending from a fuel port 208 to a first valve 210 at the first fuel tank 112 and to a second valve 212 at the second fuel tank 114. In certain examples, the fuel port 208 is accessible from an exterior of the aircraft 100. On the ground, fuel can be supplied to the aircraft through the fuel port 208, along the refueling/defueling line 206, and into the fuel tanks 112, 114. During refueling (e.g., on the ground), hydrogen vapor can be removed from the fuel tanks 112, 114 via the first ventilation line 182 and the port 184. In particular, the pressure regulators 186, 192 remain open. The check valves 190, 196 inhibit liquid hydrogen from entering into the vent lines. In certain examples, the vapor obtained from the first ventilation line 182 can be processed at liquification equipment for use as fuel in the same or another aircraft 100.

Examples of the disclosure may be described according to the following aspects.

Aspect 1. A hydrogen fuel system for an aircraft, the hydrogen fuel system comprising:

a fuel tank configured to store hydrogen in a liquid state;

a boost pump arrangement disposed within the fuel tank;

an engine feeder sub-system including a feed line connecting the boost pump arrangement to a high pressure pump disposed at an engine of the aircraft, the high pressure pump directing fuel from the feed line to a first heat exchanger and then to a fuel injector, the first heat exchanger being configured to heat the hydrogen to a supercritical liquid state; and a fuel cell sub-system including a fuel cell arrangement and a second heat exchanger upstream of the fuel cell arrangement, the second heat exchanger being coupled to the feed line of the engine feeder sub-system, the second heat exchanger being configured to heat the hydrogen to a gaseous state.

Aspect 2. The hydrogen fuel system of aspect 1, wherein the boost pump arrangement includes three boost pumps.

Aspect 3. The hydrogen fuel system of aspect 1, wherein a flow meter unit is disposed between the high pressure pump and the first heat exchanger.

Aspect 4. The hydrogen fuel system of aspect 1, further comprising an accumulator disposed in parallel with the feed line via input and output lines, the accumulator being configured to store pressurized fuel.

Aspect 5. The hydrogen fuel system of aspect 4, further comprising a jet pump having a first input connected to the accumulator, a second input connected to the feed line, and an output connected to the fuel cell sub-system, the jet pump configured to suck hydrogen vapor from the feed line and to direct the sucked hydrogen vapor to the fuel cell sub-system.

Aspect 6. The hydrogen fuel system of any of aspects 1-5, wherein the fuel tank is a first fuel tank, the boost pump arrangement is a first boost pump arrangement, the feed line is a first feed line, the high pressure pump is a first high pressure pump, and the engine is a first engine; and wherein the hydrogen fuel system further comprises a second fuel tank, a second boost pump arrangement at the second fuel tank, and a second feed line extending from the second boost pump arrangement to a second high pressure tank at a second engine of the aircraft.

Aspect 7. The hydrogen fuel system of aspect 6, wherein the first engine is disposed at a first wing of the aircraft and the second engine is disposed at a second wing of the aircraft.

Aspect 8. The hydrogen fuel system of aspect 6 or aspect 7, wherein the first and second fuel tanks are disposed at opposite sides of the fuel cell sub-system.

Aspect 9. The hydrogen fuel system of any of aspects 6-8, wherein the first and second feed lines are selectively isolated from each other at a crossfeed valve.

Aspect 10. The hydrogen fuel system of any of aspects 6-9, wherein the second heat exchanger of the fuel cell sub-system also being coupled to the second feed line.

Aspect 11. The hydrogen fuel system of aspect 10, further comprising a first shutoff valve configured to selectively isolate the second heat exchanger from the first feed line and a second shutoff valve configured to selectively isolate the second heat exchanger from the second feed line.

Aspect 12. The hydrogen fuel system of any of aspects 1-11, further comprising a ventilation sub-system including a ventilation line extending between a pressure regulator at the fuel tank and a port to atmosphere.

Aspect 13. The hydrogen fuel system of aspect 12, and preferably of aspects 6 and 12, wherein the ventilation line extends between respective pressure regulators at the first and second fuel tanks and the port to atmosphere.

Aspect 14. The hydrogen fuel system of any of aspects 1-13, further comprising a tank pressurization line extending between the fuel tank and a fuel line of the fuel cell sub-system separate from the feed line, the tank pressurization line being in communication with hydrogen vapor within the fuel tank, the fuel line being disposed downstream of the second heat exchanger and upstream of the fuel cell arrangement.

Aspect 15. The hydrogen fuel system of aspect 14, and preferably of aspects 6 and 14, wherein a first shutoff valve selectively isolates the first fuel tank from the fuel line and a second shutoff valve selectively isolates the second fuel tank from the fuel line.

Aspect 16. A hydrogen fuel system for an aircraft, the hydrogen fuel system comprising:

a fuel tank configured to store hydrogen in a liquid state;

an engine feeder sub-system including a feed line connecting the fuel tank to a high pressure pump disposed at an engine of the aircraft, the high pressure pump directing fuel from the feed line to a first heat exchanger and then to a fuel injector, the first heat exchanger being configured to heat the hydrogen to a supercritical liquid state;

an accumulator disposed in parallel with the feed line to store pressurized hydrogen obtained from the feed line, the accumulator being configured to selectively direct the pressurized hydrogen to the high pressure pump; and a jet pump having a first input coupled to the feed line, a second input coupled to the accumulator, and an output, the jet pump being configured to draw hydrogen vapor from the feed line via the first input when the accumulator directs pressurized hydrogen through the jet pump towards the output.

Aspect 17. The hydrogen fuel system of aspect 16, further comprising a fuel cell arrangement including a second heat exchanger and a stack of one or more fuel cells, wherein the output of the jet pump is directed to the fuel cell arrangement.

Aspect 18. The hydrogen fuel system of aspect 16 or aspect 17, wherein the fuel tank is a first fuel tank, the feed line is a first feed line, the accumulator is a first accumulator, and the jet pump is a first jet pump; and wherein the hydrogen fuel system further comprises a second fuel tank, a second feed line, a second accumulator disposed in parallel with the second feed line, and a second jet pump having a first input coupled to the second feed line and a second input coupled to the second accumulator.

Aspect 19. A hydrogen fuel system for an aircraft, the hydrogen fuel system comprising:

a fuel tank configured to store hydrogen in a liquid state;

a fuel cell sub-system including a fuel cell arrangement and a heat exchanger upstream of the fuel cell arrangement, the heat exchanger being coupled to the fuel tank via a feed line, the second heat exchanger being configured to heat the hydrogen obtained via the feed line to a gaseous state;

a tank pressurization line separate from the feed line, the tank pressurization line extending between the fuel tank and a fuel cell line that is disposed downstream of the heat exchanger and upstream of the fuel cell arrangement; and a shutoff valve disposed along the tank pressurization line to selectively isolate the fuel tank from the fuel cell line.

Aspect 20. The hydrogen fuel system of aspect 16 or aspect 17, wherein the fuel tank is a first fuel tank, the feed line is a first feed line, and the shutoff valve is a first shutoff valve; and wherein the hydrogen fuel system further comprises a second fuel tank to which the tank pressurization line extends, a second feed line extending between the second fuel tank and the heat exchanger, and a second shutoff valve disposed along the tank pressurization line to selectively isolate the second fuel tank from the fuel cell line, the second feed line being separate from the tank pressurization line.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A hydrogen fuel system for an aircraft, the hydrogen fuel system comprising:

a fuel tank configured to store hydrogen in a liquid state;

a boost pump arrangement disposed within the fuel tank;

an engine feeder sub-system including a feed line connecting the boost pump arrangement to a high pressure pump disposed at an engine of the aircraft, the high pressure pump directing fuel from the feed line to a first heat exchanger and then to a fuel injector, the first heat exchanger being configured to heat the hydrogen to a supercritical liquid state;

a fuel cell sub-system including a fuel cell arrangement and a second heat exchanger upstream of the fuel cell arrangement, the second heat exchanger being coupled to the feed line of the engine feeder sub-system, the second heat exchanger being configured to heat the hydrogen to a gaseous state; and wherein the fuel cell arrangement connects to the fuel tank via a fuel cell line of the fuel cell sub-system and a tank pressurization line separate from the feed line.

2. The hydrogen fuel system of claim 1, wherein the boost pump arrangement includes three boost pumps.

3. The hydrogen fuel system of claim 1, wherein a flow meter unit is disposed between the high pressure pump and the first heat exchanger.

4. The hydrogen fuel system of claim 1, further comprising an accumulator disposed in parallel with the feed line via input and output lines, the accumulator being configured to store pressurized fuel.

5. The hydrogen fuel system of claim 4, further comprising a jet pump having a first input connected to the accumulator, a second input connected to the feed line, and an output connected to the fuel cell sub-system, the jet pump configured to suck hydrogen vapor from the feed line and to direct the sucked hydrogen vapor to the fuel cell sub-system.

6. The hydrogen fuel system of any of claims 1-5, wherein the fuel tank is a first fuel tank, the boost pump arrangement is a first boost pump arrangement, the feed line is a first feed line, the high pressure pump is a first high pressure pump, and the engine is a first engine; and wherein the hydrogen fuel system further comprises a second fuel tank, a second boost pump arrangement at the second fuel tank, and a second feed line extending from the second boost pump arrangement to a second high pressure tank at a second engine of the aircraft.

7. The hydrogen fuel system of claim 1, wherein the engine is a first engine, wherein the aircraft further comprises a second engine, and wherein the first engine is disposed at a first wing of the aircraft and the second engine is disposed at a second wing of the aircraft.

8. The hydrogen fuel system of claim 1, wherein the fuel tank is a first fuel tank, wherein the hydrogen fuel system further comprises a second fuel tank, and wherein the first and second fuel tanks are disposed at opposite sides of the fuel cell sub-system.

9. The hydrogen fuel system of claim 1, wherein the feed line is a first feed line, wherein the hydrogen fuel system further comprises a second feed line, and wherein the first and second feed lines are selectively isolated from each other at a crossfeed valve.

10. The hydrogen fuel system of claim 1, wherein the feed line is a first feed line, wherein the hydrogen fuel system further comprises a second feed line, and wherein the second heat exchanger of the fuel cell sub-system also being coupled to the second feed line.

11. The hydrogen fuel system of claim 10, further comprising a first shutoff valve configured to selectively isolate the second heat exchanger from the first feed line and a second shutoff valve configured to selectively isolate the second heat exchanger from the second feed line.

12. The hydrogen fuel system of claim 1, further comprising a ventilation sub-system including a ventilation line extending between a pressure regulator at the fuel tank and a port to atmosphere.

13. The hydrogen fuel system of claim 12, wherein the fuel tank is a first fuel tank, and wherein the hydrogen fuel system further comprises a second fuel tank, wherein the ventilation line extends between respective pressure regulators at the first and second fuel tanks and the port to atmosphere.

14. The hydrogen fuel system of claim 1, further comprising a tank pressurization line extending between the fuel tank and a fuel line of the fuel cell sub-system separate from the feed line, the tank pressurization line being in communication with hydrogen vapor within the fuel tank, the fuel line being disposed downstream of the second heat exchanger and upstream of the fuel cell arrangement.

15. The hydrogen fuel system of claim 14, wherein the fuel tank is a first fuel tank, and wherein the hydrogen fuel system further comprises a second fuel tank, wherein a first shutoff valve selectively isolates the first fuel tank from the fuel line and a second shutoff valve selectively isolates the second fuel tank from the fuel line.

16. A hydrogen fuel system for an aircraft, the hydrogen fuel system comprising:

a fuel tank configured to store hydrogen in a liquid state;

a boost pump arrangement disposed within the fuel tank;

an engine feeder sub-system including a feed line connecting the boost pump arrangement to a high pressure pump disposed at an engine of the aircraft, the high pressure pump directing fuel from the feed line to a first heat exchanger and then to a fuel injector, the first heat exchanger being configured to heat the hydrogen to a supercritical liquid state;

a fuel cell sub-system including a fuel cell arrangement and a second heat exchanger upstream of the fuel cell arrangement, the second heat exchanger being coupled to the feed line of the engine feeder sub-system, the second heat exchanger being configured to heat the hydrogen to a gaseous state; and a jet pump having a first input connected to an accumulator, a second input connected to the feed line, and an output connected to the fuel cell sub-system, the jet pump configured to suck hydrogen vapor from the feed line and to direct the sucked hydrogen vapor to the fuel cell sub-system.

17. A hydrogen fuel system for an aircraft, the hydrogen fuel system comprising:

a fuel tank configured to store hydrogen in a liquid state;

a boost pump arrangement disposed within the fuel tank;

an engine feeder sub-system including a feed line connecting the boost pump arrangement to a high pressure pump disposed at an engine of the aircraft, the high pressure pump directing fuel from the feed line to a first heat exchanger and then to a fuel injector, the first heat exchanger being configured to heat the hydrogen to a supercritical liquid state; and a fuel cell sub-system including a fuel cell arrangement and a second heat exchanger upstream of the fuel cell arrangement, the second heat exchanger being coupled to the feed line of the engine feeder sub-system, the second heat exchanger being configured to heat the hydrogen to a gaseous state;

wherein the fuel tank is a first fuel tank, the boost pump arrangement is a first boost pump arrangement, the feed line is a first feed line, the high pressure pump is a first high pressure pump, and the engine is a first engine; wherein the hydrogen fuel system further comprises a second fuel tank, a second boost pump arrangement at the second fuel tank, and a second feed line extending from the second boost pump arrangement to a second high pressure tank at a second engine of the aircraft; and wherein the first and second feed lines are selectively isolated from each other at a crossfeed valve.

18. A hydrogen fuel system for an aircraft, the hydrogen fuel system comprising:

a fuel tank configured to store hydrogen in a liquid state;

a boost pump arrangement disposed within the fuel tank;

an engine feeder sub-system including a feed line connecting the boost pump arrangement to a high pressure pump disposed at an engine of the aircraft, the high pressure pump directing fuel from the feed line to a first heat exchanger and then to a fuel injector, the first heat exchanger being configured to heat the hydrogen to a supercritical liquid state; and a fuel cell sub-system including a fuel cell arrangement and a second heat exchanger upstream of the fuel cell arrangement, the second heat exchanger being coupled to the feed line of the engine feeder sub-system, the second heat exchanger being configured to heat the hydrogen to a gaseous state;

wherein the fuel tank is a first fuel tank, the boost pump arrangement is a first boost pump arrangement, the feed line is a first feed line, the high pressure pump is a first high pressure pump, and the engine is a first engine; wherein the hydrogen fuel system further comprises a second fuel tank, a second boost pump arrangement at the second fuel tank, and a second feed line extending from the second boost pump arrangement to a second high pressure tank at a second engine of the aircraft; and wherein the second heat exchanger of the fuel cell sub-system also being coupled to the second feed line.

19. The hydrogen fuel system of claim 18, further comprising a first shutoff valve configured to selectively isolate the second heat exchanger from the first feed line and a second shutoff valve configured to selectively isolate the second heat exchanger from the second feed line.

20. A hydrogen fuel system for an aircraft, the hydrogen fuel system comprising:

a first fuel tank configured to store hydrogen in a liquid state;

a second fuel tank;

a boost pump arrangement disposed within the first fuel tank;

an engine feeder sub-system including a feed line connecting the boost pump arrangement to a high pressure pump disposed at an engine of the aircraft, the high pressure pump directing fuel from the feed line to a first heat exchanger and then to a fuel injector, the first heat exchanger being configured to heat the hydrogen to a supercritical liquid state;

a fuel cell sub-system including a fuel cell arrangement and a second heat exchanger upstream of the fuel cell arrangement, the second heat exchanger being coupled to the feed line of the engine feeder sub-system, the second heat exchanger being configured to heat the hydrogen to a gaseous state; and a ventilation sub-system including a ventilation line, wherein the ventilation line extends between respective pressure regulators at the first and second fuel tanks and a port to atmosphere.

21. A hydrogen fuel system for an aircraft, the hydrogen fuel system comprising:

a first fuel tank configured to store hydrogen in a liquid state;

a second fuel tank;

a boost pump arrangement disposed within the first fuel tank;

an engine feeder sub-system including a feed line connecting the boost pump arrangement to a high pressure pump disposed at an engine of the aircraft, the high pressure pump directing fuel from the feed line to a first heat exchanger and then to a fuel injector, the first heat exchanger being configured to heat the hydrogen to a supercritical liquid state;

a fuel cell sub-system including a fuel cell arrangement and a second heat exchanger upstream of the fuel cell arrangement, the second heat exchanger being coupled to the feed line of the engine feeder sub-system, the second heat exchanger being configured to heat the hydrogen to a gaseous state; and a tank pressurization line extending between the first fuel tank and a fuel line of the fuel cell sub-system separate from the feed line, the tank pressurization line being in communication with hydrogen vapor within the fuel tank, the fuel line being disposed downstream of the second heat exchanger and upstream of the fuel cell arrangement, wherein a first shutoff valve selectively isolates the first fuel tank from the fuel line and a second shutoff valve selectively isolates the second fuel tank from the fuel line.

* * * * *